United States Patent
Yin et al.

(10) Patent No.: US 12,267,598 B2
(45) Date of Patent: Apr. 1, 2025

(54) METHOD OF IMAGE FUSION

(71) Applicant: Guangzhou Tyrafos Semiconductor Technologies Co., Ltd., Guangzhou (CN)

(72) Inventors: Ping-Hung Yin, Hsinchu (TW); Yung-Ming Chou, Hsinchu (TW); Bo-Jia Lin, Hsinchu (TW); Yu-Sheng Liao, Hsinchu (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 98 days.

(21) Appl. No.: 18/243,181

(22) Filed: Sep. 7, 2023

(65) Prior Publication Data
US 2024/0089611 A1    Mar. 14, 2024

(30) Foreign Application Priority Data
Sep. 8, 2022 (TW) ................................. 111134124

(51) Int. Cl.
*H04N 23/81* (2023.01)
*H04N 5/265* (2006.01)
*H04N 23/71* (2023.01)
*H04N 23/76* (2023.01)

(52) U.S. Cl.
CPC ............. *H04N 23/81* (2023.01); *H04N 5/265* (2013.01); *H04N 23/71* (2023.01); *H04N 23/76* (2023.01)

(58) Field of Classification Search
CPC ........ H04N 23/81; H04N 5/265; H04N 23/71; H04N 23/76
See application file for complete search history.

(56) References Cited

U.S. PATENT DOCUMENTS

| | | | |
|---|---|---|---|
| 11,729,518 B2* | 8/2023 | Rivard | H04N 9/76 348/222.1 |
| 2012/0162424 A1* | 6/2012 | Murao | H04N 23/71 348/148 |
| 2017/0332008 A1* | 11/2017 | Tsuchiya | H04N 23/635 |
| 2019/0297247 A1* | 9/2019 | Yang | G06T 5/92 |

* cited by examiner

*Primary Examiner* — Mekonnen D Dagnew

(57) ABSTRACT

The present invention relates to a method of image fusion, which uses the brightness difference of the current frame and the previous frame to determine whether the pixel in a frame image is static or dynamic. If the current pixel is static, the previous corresponding pixel is superimposed onto the current pixel; if the current pixel is dynamic, the previous corresponding pixel is replaced with the current pixel.

9 Claims, 6 Drawing Sheets

METHOD OF IMAGE FUSION

CROSS-REFERENCE TO RELATED APPLICATION

This application claims the priority of Taiwanese patent application No. 111134124, filed on Sep. 8, 2022, which is incorporated herewith by reference.

BACKGROUND OF THE INVENTION

1. Field of the Invention

The present invention relates generally to a method of image fusion, and more particularly, to an imaging principle based on an image sensor, which judges whether the pixel is dynamic or static based on the light intensity difference of pixels at the same position in the previous and subsequent frames, and keeps the trajectory while suppressing the background noise to finally fuse to present a single frame of a complete image so that the dynamic objects and the static scenes in the image are clear.

2. The Prior Arts

Generally, image processing records images or videos in units of frames, and uses single-frame long-exposure or multi-frame short-exposure to perform superposition imaging. However, regardless of the above either method, if there is a high-speed moving object during the shooting, it is prone to generating blur and producing afterimages, as shown in FIG. 1.

The current technology of camera is to take a picture and expose for a period of time to obtain a clear image, and if multiple images are played continuously, a film is obtained. However, if there is an object in the image that moves relatively fast during exposure, the resulted image will have an afterimage effect, which will not be conducive to clearly presenting the dynamic object in the image.

On the other hand, the short-exposure and high-frame-rate imaging method can retain the trajectory of high-speed moving objects, but because of the flicker noise generated by the short exposure of the CMOS image sensor (CIS), the quality of the output image is obviously reduced.

The traditional dynamic vision sensor (DVS) is an event-based image sensor, which can calculate the brightness changes of the previous and subsequent frames at a very high frame rate, up to 2000 fps, and only the pixel information with large brightness changes will be recorded; that is, only dynamic objects in the scene are observed and their coordinates and addresses are recorded, but the complete information of static images are not recorded at the same time, and the short integration time results in high noise and low resolution. Unless an additional color image sensor is added, not only the cost and volume of the sensing block will increase, but also the amount of calculation will also be increased to solve the problem of spatial synchronization of two sensors at different positions, making the overall system more complex.

Therefore, the present invention is provided to address the above-mentioned issues.

SUMMARY OF THE INVENTION

In order to achieve the aforementioned objective, the present invention provides a method of image fusion, based on the imaging principle of the image sensor, the light intensity change of the pixel at the same position in the previous and subsequent frames is used to judge whether the pixel is dynamic or static, and the trajectory is kept while suppressing the background noise to finally fuse and present a single frame of a complete image, so that both dynamic objects and static scenes in the image are clear.

The present invention comprises: obtaining an image information; obtaining a brightness value of each pixel; calculating an absolute value of the brightness difference with a previous frame or a sum of the brightness difference with a plurality of previous frames; judging whether the calculation result is less than or equal to a preset threshold; if so, pixels being judged to be static, and inheriting frame by frame; otherwise, pixels being judged to be dynamic, and refreshing frame by frame.

Preferably, each frame of image information further comprises a plurality of pixels, and there are corresponding pixels in each frame of image.

Preferably, the process of obtaining the image information is a continuous process.

Preferably, after obtaining the brightness value of each pixel, the brightness value of each pixel in the current frame is compared against the brightness value of the corresponding pixel in the previous frame, and the absolute value of the difference value is calculated; or, the brightness value of each pixel in the current frame is compared against the brightness value of each corresponding pixel in a plurality of previous frames, and the sum of the absolute value of all the differences is calculated.

Preferably, after the absolute value of the brightness difference is compared with the preset threshold, if the absolute value is less than or equal to the preset threshold, the pixel is judged as a static pixel and then inherits frame by frame, and the pixels of the two frames are superimposed together, if the absolute value is greater than the preset threshold, the pixel is judged to be a dynamic pixel and refreshes frame by frame, and replaces the pixel of the previous frame with the pixel of the current frame.

In order to make those skilled in the art understand the purpose, features and effects of the present invention, the present invention is described in detail below by the following specific examples, and in conjunction with the accompanying drawings.

DETAILED DESCRIPTION OF THE PREFERRED EMBODIMENT

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
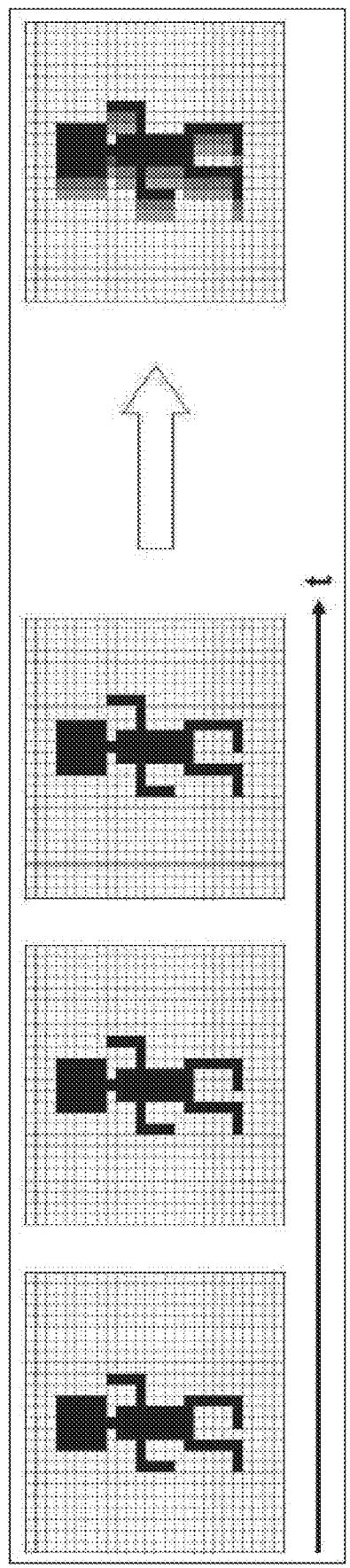
FIG. 1 is the schematic view of prior art.
Figure 2:
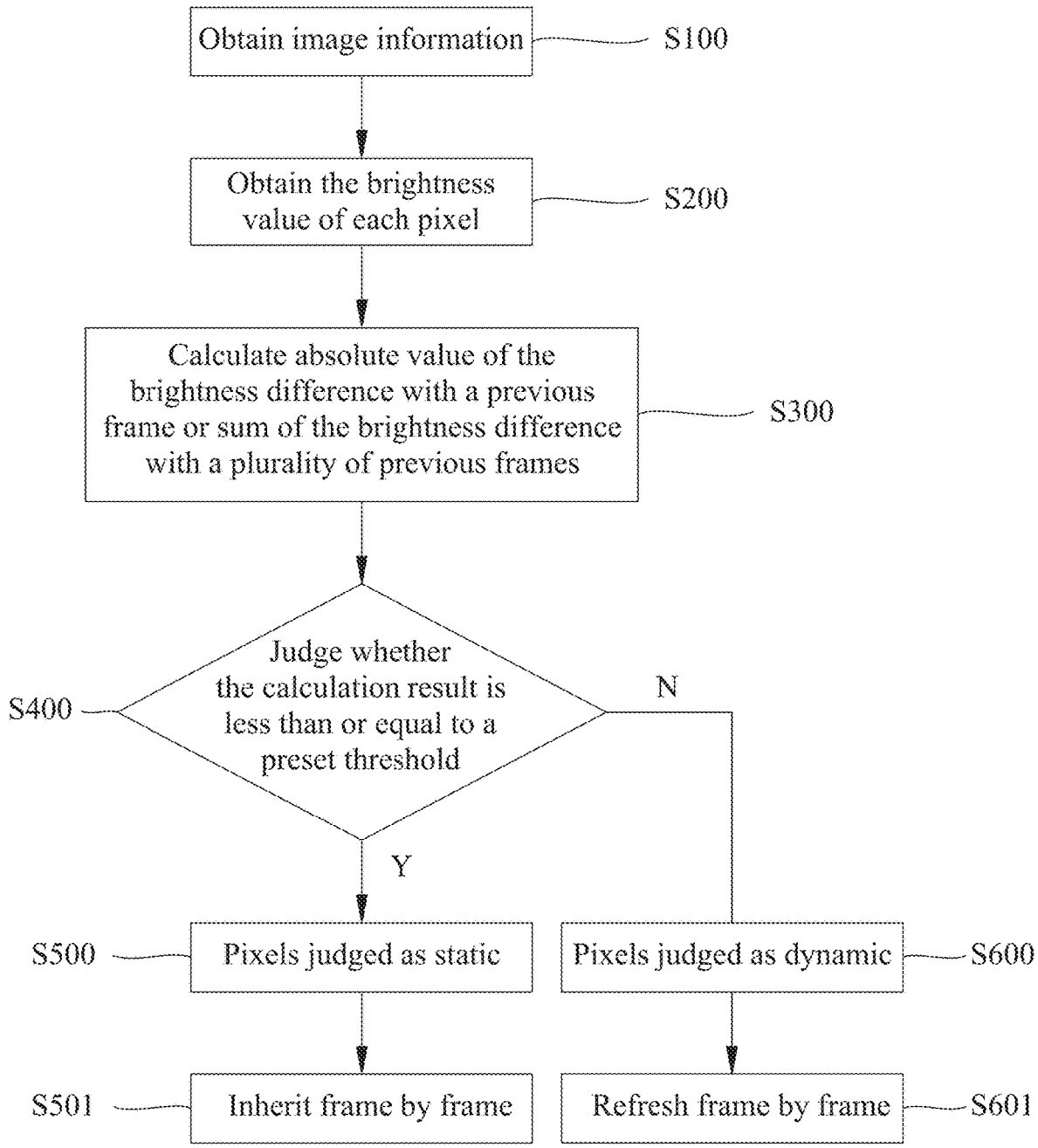
FIG. 2 is the flowchart of the method of image fusion according to the present invention.

Referring to FIG. 2, FIG. 2 is a flowchart of the method of image fusion according to the present invention, comprising the steps S100-S601, wherein step S400 is a judgment process.

Specifically, step S100 is to obtain an image information; step S200 is to obtain a brightness value of each pixel; step S300 is to calculate the absolute value of the brightness difference with a previous frame or the sum of the brightness differences with a plurality of previous frames; step S400 is to judge whether the calculation result is less than or equal to a preset threshold; step S500 is to judge the pixel as a static pixel, and step S501 is to perform inhering frame by frame; otherwise, step S600 is to judge the pixel as a dynamic pixel, and step S601 is to perform refreshing frame by frame.

Specifically, in step S100, the present invention is mainly based on the imaging principle of an image sensor (e.g., CMOS Image Sensor, CIS), and uses a photographic lens to shoot images frame by frame with a plurality of short-exposure frames, so as to obtain images information, and the image information comprises a plurality of frames of images, and the images are sequenced in time.

Wherein, each obtained frame of image includes a plurality of pixels. In other words, the frame of image is composed of a plurality of pixels. There are corresponding pixels in each frame of image, for example, each frame of image comprises 2×2 pixels, so the pixels in the upper left corner of each frame of image are the corresponding pixels; that is, the pixels at the same position in each frame of image are defined as the corresponding pixels, and the definition facilitates the discussion of the subsequent steps.

Specifically, in step S200, a processor is used to calculate the brightness value of each pixel in the current frame image in the image information obtained in step S100. For example, each frame of image comprises 2×2 pixels. In step S200, the brightness values of the four pixels are calculated. In addition, the commonly used image size of 1920×1080 comprises 1920×1080 pixels. In step S200, the brightness values of all 1920×1080 pixels are calculated.

Specifically, the process of obtaining image information in step S100 is a continuous and iterative process, for example, shooting a film with 4 frames of images, step S100 will continuously obtain the first to fourth frames of images, and when the first frame of image is obtained, the process will proceed to step S200 to obtain the brightness value of each pixel in the first frame of image, and then obtain the second frame of image and perform step S200 again to obtain the brightness value of each pixel in the second frame of image, until finishing the fourth frame image.

Specifically, in step S300, following step S200 to calculate and obtain the brightness value of each pixel, the processor compares the brightness value of each pixel in the current frame image against the corresponding pixel in the previous frame image and calculates the absolute value of the brightness difference of the pixel in the image, or compares the brightness value of each pixel in the current frame image against the corresponding pixel in a plurality of previous frame images and calculates the sum of the absolute value of all the brightness differences of each corresponding pixel in the previous frame images.

Specifically, for the same example, a film having 4 frames of images is shot, and there will be no action when the first frame of image reaches step S300, because there is no pixel brightness value of the previous frame image, but the absolute value of brightness difference will be calculated in step S300 for the two frames of images, and when the third frame is obtained and brightness value obtained, step S300 will calculate the sum of the absolute value of all the brightness differences of each corresponding pixel in the previous frame images.

For the same example, each frame of image comprises 2×2 pixels, so each frame of image will produce the absolute value of brightness difference of 4 pixels after step S300, and the absolute value of brightness difference of these 4 pixels will be calculated from the brightness value of the pixel corresponding to the previous frame image.

Specifically, in step S400, the processor compares the value calculated in step S300 with the preset threshold and judges. The preset threshold has no fixed value and can be the most consistent value after a plurality of tests. The most consistent can be further interpreted as the least afterimage on the image screen. It should be noted that the preset threshold value usually does not exceed 5% of the pixel value. For example, if the pixel value of a pixel is 500, the preset threshold value will not exceed 25.

However, the present invention does not limit the value of the preset threshold, but using the preset threshold as a judgment standard is still one of the features of the present invention.

After the step S400 compares with the preset threshold, the processor finds that if the result calculated in the step S300 is less than or equal to the preset threshold, the process executes the step S500 to confirm that the pixel is a static pixel, and if the result calculated in the step S300 is greater than the preset threshold, then executes step S600 to confirm that the pixel is a dynamic pixel.

In step S500, because the value calculated in step S300 is less than or equal to the preset threshold, the pixel in the current frame image is judged to be a static pixel, and step S501 is then to inherit frame by frame.

Specifically, the frame-by-frame inheritance in step S501 means that in the current pixel of the current frame image, which is judged as a static pixel, there is no object moving or light and shadow change, and so on, and therefore, it also represents that the current pixel of the current frame image can be regarded as the same as the corresponding pixel of the previous frame image, so the pixels of the two frame images are superimposed together.

It should be noted that the pixels of at least one previous frame image can also be superimposed, but the premise is that it needs to be judged that the pixels of at least one previous frame image are also static pixels.

In step S600, because the value calculated in step S300 is greater than the preset threshold, it is judged that the pixel in the current frame image is a dynamic pixel, and step S601 is to refresh frame by frame.

Specifically, the frame-by-frame refresh in step S601 means that in the current pixel of the current frame image, because the pixel is judged to be dynamic, that is, there is an object moving or light and shadow changes, and so on, therefore, it also represents the current pixel of the current frame image is not the same as the corresponding pixel of the previous frame image, so the pixel of the previous frame image is replaced with the pixel of the current frame image.

Steps S100-S601 are repeated until the calculation and processing of the last frame of image is completed, and finally a resulted frame image is output.

Figure 3:
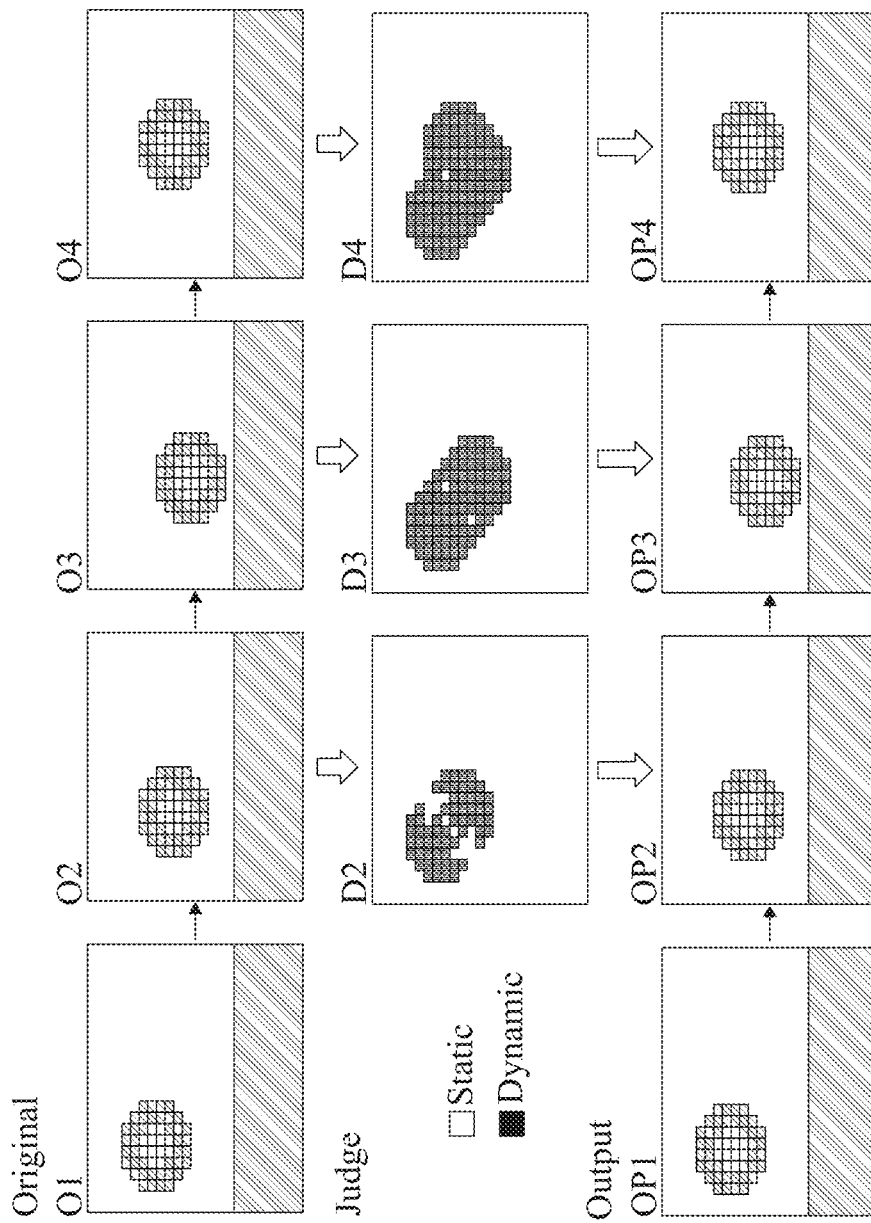
FIG. 3 is a schematic view of an embodiment of the method of image fusion according to the present invention.

Refer to FIG. 2 and FIG. 3. FIG. 3 is a schematic view of an embodiment of the present invention, which is described in detail in conjunction with FIGS. 2 and 3.

The O1-O4 in FIG. 3 are the image information obtained in step S100, and can also be expressed as the obtained original image information. The image information obtained in the present embodiment has a total of 4 frames of images, which are labeled as O1-O4 respectively. From the original image information O1-O4 of these 4 frames of images, it can be clearly seen that an object is moving.

Specifically, when the original image information O1 is obtained in step S100, it is the first frame of image, and the brightness value of each pixel is calculated in step S200. Because it is the first frame of image, it does not go through the steps S300-S601, but a resulted frame image OP1 is directly output, which also means that all the pixels of the first frame of image have not been modified or replaced.

When the original image information O2 is obtained, it is the second frame image, that is, there is at least one previous frame image that can be compared against, so step S200 is executed to calculate the brightness value for each pixel in the original image information O2, and then step S300 is executed to calculate the absolute value of the brightness difference between each pixel in the original image information O2 and each corresponding pixel in the original image information O1.

Specifically, there are two approaches going from step S200 to step S300. One is to calculate the brightness value of a pixel of the original image information O2, that is, to calculate the difference from the brightness values of the corresponding pixel in the original image information O1 and then take the absolute value. The other approach is to calculate the brightness value of each pixel of the original image information O2 first, and then calculate the difference between the brightness values of each pixel and the corresponding pixel in the original image information O1 and take the absolute value.

After calculating the absolute value of the brightness difference between all the pixels of the original image information O2 and O1, steps S400, S500 and S600 are executed to compare the absolute value of the brightness difference with the preset threshold, and judge whether the each pixel in the original image information O2 is a dynamic or static pixel. The comparison and judgment results are shown in the judgment image D2 in FIG. 3. It can be seen in FIG. 3 that if the pixel is white, it means it is a static pixel, that is, the absolute value of the brightness difference is less than or equal to the preset threshold; if the pixel is black, it is judged as a dynamic pixel, that is, the absolute value of the brightness difference is greater than or equal to the preset threshold.

Then, the process proceeds to steps S501 and S601 accordingly. When the pixel is judged as a dynamic pixel, the pixel of the original image information O1 will be replaced with the pixel of the original image information O2. When the pixel is judged as a static pixel, the pixels in two original images will be superimposed. After steps S501 and S601, a resulted frame image OP2 can be obtained. As seen in FIG. 3, the original image information O2 and the resulted frame image OP2 are not the same because some pixels have been replaced.

Specifically, repeat the steps S100-S601 to calculate, compare and judge the original image information O3, O4, to obtain resulted frame images OP3, OP4.

When the original image information O3 is obtained, it is the third frame image, which already has at least one previous frame image that can be compared against, therefore, step S200 is executed to calculate the brightness value for each pixel in the original image information O3, followed by executing step S300 to calculate the absolute value of the brightness difference between each pixel in the original image information O3 and each corresponding pixel in the original image information O2.

When there are more than two frames of images that can be compared against, the calculation in step S300 can be performed in two approaches: one is to calculate the absolute value of the brightness difference of each pixel between the original image information O3 and the corresponding pixel in the original image information O2, and the other is to calculate the sum of the absolute value of the brightness difference against the plurality of previous frames. In the present embodiment, it is to calculate the absolute value of the brightness difference for each pixel in the original image information O3 and the corresponding pixel in the original image information O2, and add the absolute value of the brightness difference for each pixel in the original image information O2 and the corresponding pixel in the original image information O1. It can be expressed by a simple formula: $Diff3=|diff(2, 3)|+|diff(1, 2)|$.

Similarly, when the original image information O4 is obtained, the calculation of step S300 can be expressed as: $Diff4=|diff(3, 4)|$ or $Diff4=|diff(3, 4)|+|diff(2, 3)|+|diff(1, 2)|$.

However, the calculation method selected in step S300 must be consistent for all the frames in the image, and different methods cannot be used for different frames in the same image processing process, and when different calculation methods are selected, the preset threshold value can also be changed accordingly.

It should be noted that, for the convenience of explanation and description, the present invention divides the process into steps S100-S601, which may be misunderstood as that the original image information O1-O4 and the resulted frame images OP1-OP4 are all single frames, but in fact, they are all continuous images. As mentioned in the prior arts, the original image information O1-O4 will show afterimages, but the resulted frame images OP1-OP4 after the method of image fusion of the present invention will not show afterimages.

In addition, because in steps S501 and S601, if it is judged to be a static pixel, the pixel will be superimposed, and if it is judged to be a dynamic pixel, it will replace the corresponding pixel, which will cause the brightness value of the pixel in the resulted frame images OP1-OP4 to be different from the original image information O1-O4. The superposition of pixels will increase the brightness value; therefore if some pixels are always judged as static pixels, these pixels will always be superimposed and appear particularly bright in the resulted frame images OP1-OP4, making the contrast distorted.

Therefore, in step S601 to refresh frame by frame, in addition to replacing the pixels of the previous frame image with the pixels of the current frame image, a gain value can be further multiplied to supplement the brightness.

In addition, when the present invention judges whether a pixel is a static or dynamic pixel, in addition to the above-mentioned calculation of the absolute value of the brightness difference between the corresponding pixels in the current frame image and the previous frame image, the taking absolute value may be omitted, and the judgment rule becomes: negative preset threshold≤brightness difference-≤positive preset threshold implies static pixels, brightness difference<negative preset threshold or brightness difference>positive preset threshold implies dynamic pixels.

Figure 4:
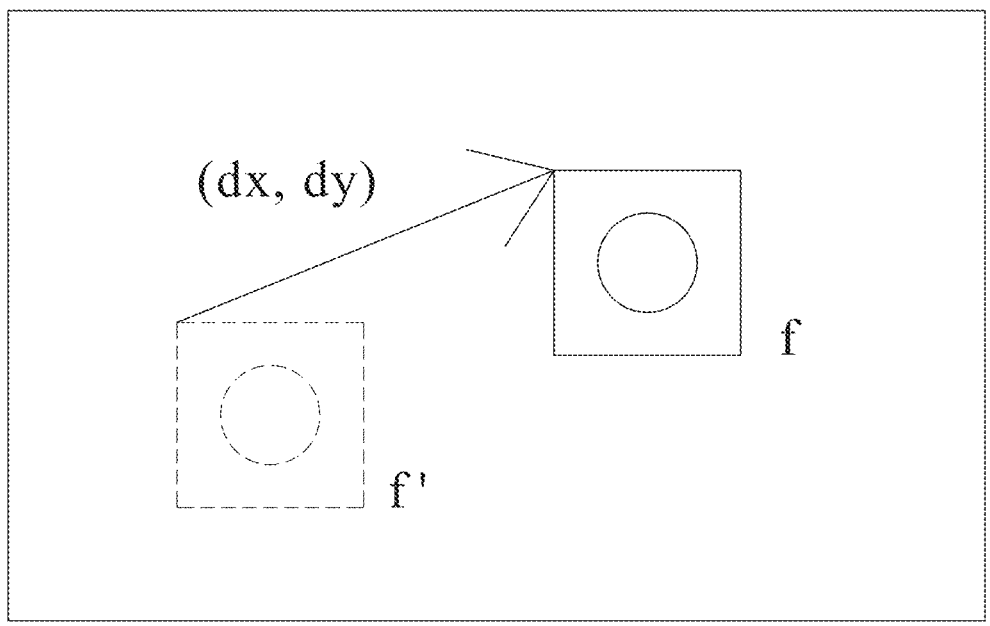
FIG. 4 is a schematic view of another embodiment of the method of image fusion according to the present invention.

Refer to FIG. 4. FIG. 4 shows another approach for the processor to judge whether a pixel is a static pixel or a dynamic pixel in the method of image fusion of the present invention, by using the block matching method of the motion estimation methods. The previous frame image fn-1 is divided into many blocks f', then each block f' is matched against the current frame image to find the block f with the highest similarity. Finally, according to the result of the matching position, the motion vector of that block can be obtained, as (dx, dy) in FIG. 4. Then, after the movement of all blocks is found, the final movement estimation results of all blocks are obtained. This method can be applied to the present invention to replace the blocks with pixels, and the pixel f' in the previous frame image fn-1 is matched against the current frame image to find the pixel f with the highest similarity.

Specifically, the most common block matching method is the three-step search method, which is a simple algorithm that can effectively reduce the amount of calculation required in movement estimation. When starting to calculate the block matching, select only 9 position blocks, calculate and find the highest similarity among the 9 blocks, and select 9 blocks centered on this block. It should be noted that the distance between these 9 blocks selected this time is only half of the first time selection, and then perform the second calculation in the same way followed by the third calculation to get the final matching result, as shown in FIG. 5.

Figure 5:
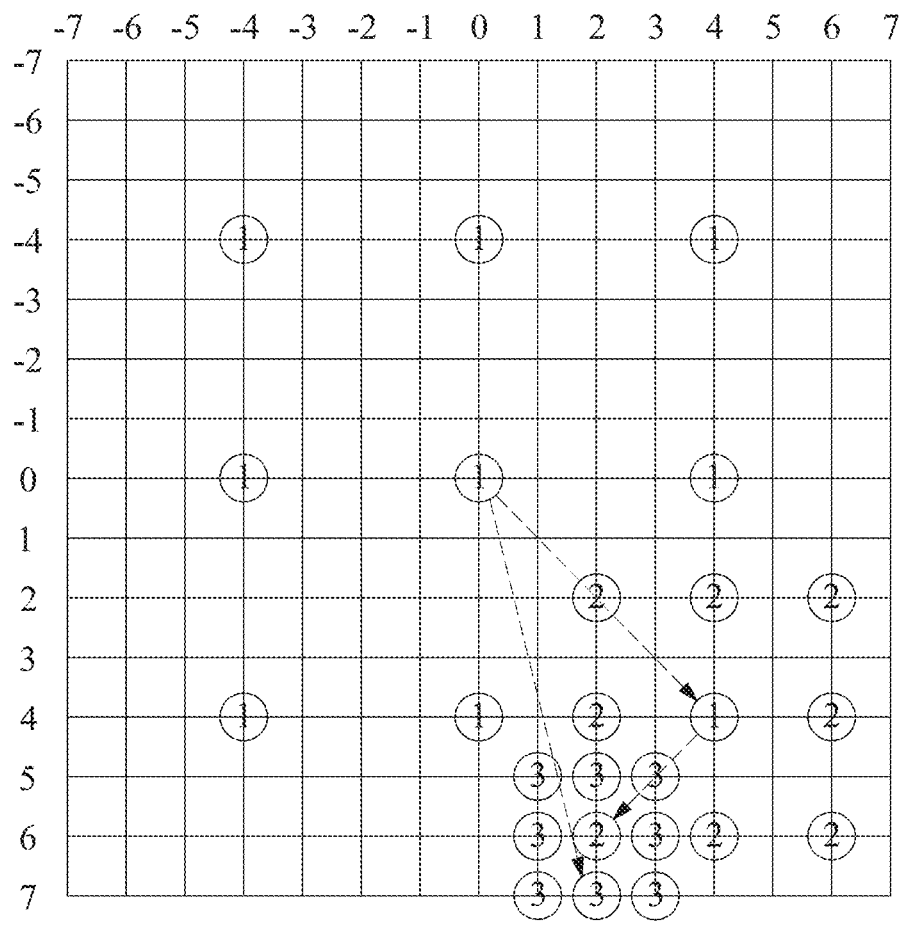
FIG. 5 is a schematic view of another embodiment of the method of image fusion according to the present invention.

The points numbered 1 in FIG. 5 are the 9 blocks selected for the first time, based on the block with coordinates (0, 0) calculated to find the one with the highest similarity, assuming that the most similar one is coordinates (4, 4). For the second time calculation, 9 blocks centered on the block with coordinates (4, 4) are selected, which are the points labeled 2, and the calculation finds the most similar block to be with coordinates (2, 6), and finally the block with coordinates (2, 7) is found to be the block with the highest similarity with coordinates (0, 0).

Specifically, the matching calculation function can use mean difference or mean absolute difference $$(MAD) = \frac{1}{N^2} \sum_{i=0}^{n-1} \sum_{j=0}^{n-1} |C_{ij} - R_{ij}|,$$

or mean square error $$(MSE) = \frac{1}{N^2} \sum_{i=0}^{n-1} \sum_{j=0}^{n-1} (C_{ij} - R_{ij})^2,$$

where N is the size of the pixel, and Cij and Rij are the current pixel and the compared pixel in the previous frame, respectively.

Figure 6:
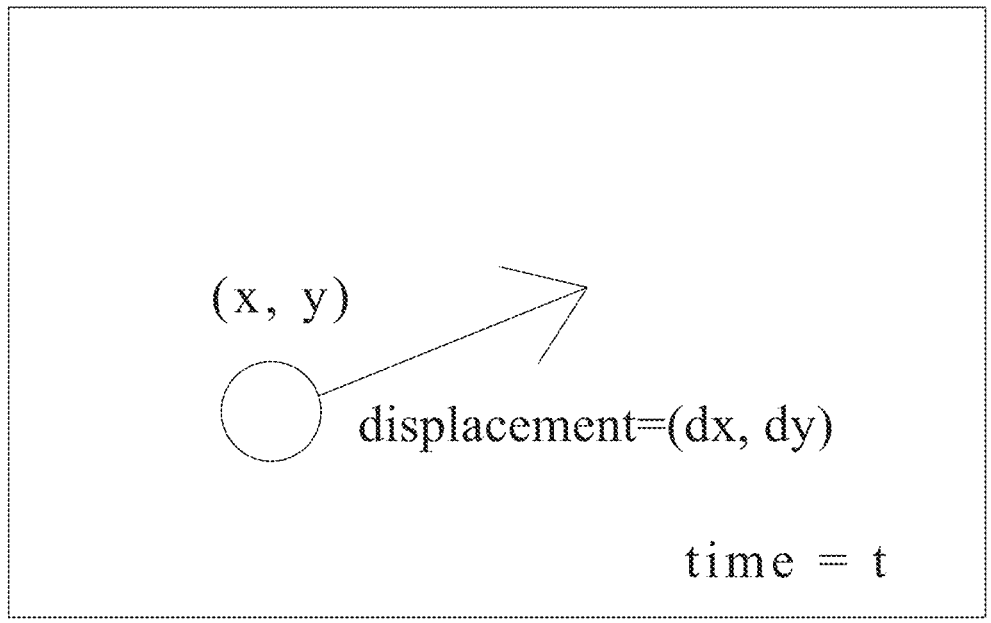
FIG. 6 is a schematic view of another embodiment of the method of image fusion according to the present invention.
Figure 6:
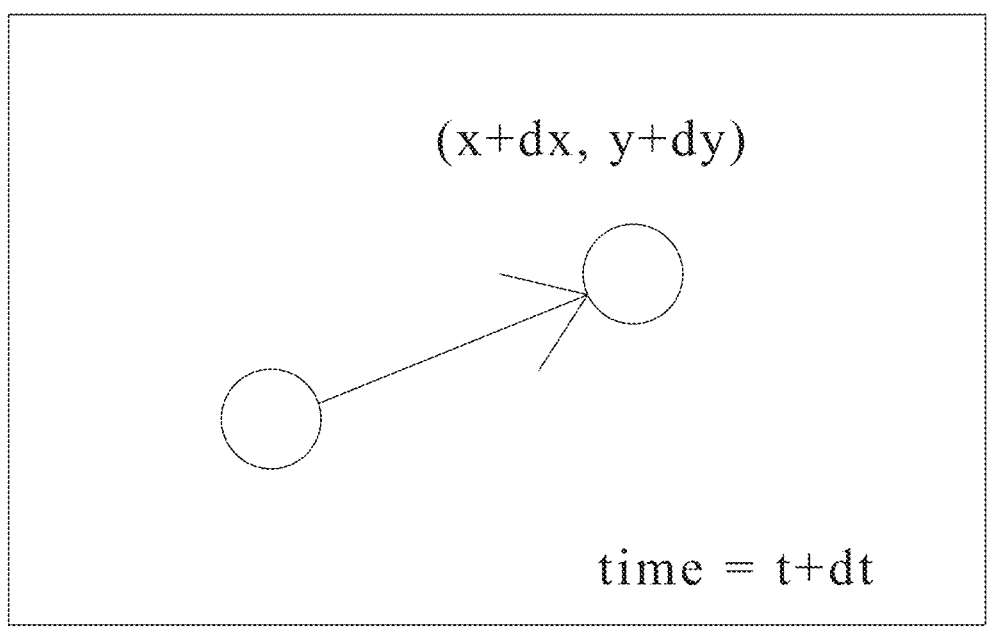

Refer to FIG. 6. FIG. 6 shows another approach for the processor to judge whether a pixel is a static pixel or a dynamic pixel in the method of image fusion of the present invention. In the present embodiment, the movement estimation method used is the optical flow method. Based on the gradient change of each pixel on the horizontal axis, vertical axis and time axis, and since the pixels located near each other will have similar or the same movement, it can be used to calculate the movement change of that pixel, as shown in FIG. 6. When time=t, the position of a certain pixel is (x, y), and when time=t+dt, the position of the pixel moves to (x+dx, y+dy). The movement of all pixels in the image is calculated repeatedly in this way, and then the estimation of the movement vector of all pixels can be obtained.

Specifically, the present invention uses the sparse optical flow method, which is a method for image matching specifically for points on the image. In other words, when a certain point is given, find the corresponding point in the current image. When described in mathematical language, given the reference graph T and the current graph I, it is to calculate a point $Q(x_p+u, y_p+v)$ in the current image I corresponding to a point $P(x_p, y_p)$ in the reference graph T, where (u, v) is the offset of the point; if all points within a certain range centered on the point P and the point Q are the same, then it means that the two points are matched, and then the movement of a certain point can be known, which achieves the purpose of tracking.

After using the aforementioned movement estimation method to judge whether a pixel is a static pixel or a dynamic pixel; if it is a static pixel, it is superimposed, and if it is a dynamic pixel, it is replaced, and then the processor outputs the resulted frame image.

Finally, the technical features of the present invention and the technical effects that can be achieved are summarized as follows:

First, with the method of image fusion of the present invention, each frame of image information simultaneously presents clear dynamic objects and static scenes.

Second, with the method of image fusion of the present invention, based on the imaging principle of the image sensor, it is judged whether the pixel is dynamic or static by the light intensity change of the pixel at the same position in the previous and subsequent frames, and the trajectory is kept while suppressing the background noise, and the final fusion (i.e. combination) presents a complete single-frame image, so that both dynamic objects and static scenes in the image are clear.

Third, with the method of image fusion of the present invention, the response speed is fast, the delay is low, the amount of data processed at a high frame rate is small, and the power consumption is low.

The above is to illustrate the implementation of the present invention through specific examples. Those skilled in the art can easily understand other advantages and effects of the present invention from the content disclosed in this specification.

The above descriptions are only preferred embodiments of the present invention and are not intended to limit the scope of the present invention; all other equivalent changes or modifications that do not deviate from the spirit disclosed in the present invention shall be included in the scope of the present invention which is intended to be defined by the appended claims.

What is claimed is:

1. A method of image fusion, comprising the steps of:
    using a processor to drive a camera to shoot frame by frame to obtain an image information, wherein the image information comprises a plurality of frames of images, the images are formed sequentially in time series, and each of the images comprises a plurality of pixels;
    the processor obtaining a brightness value of each pixel;
    the processor calculating an absolute value of brightness difference with a corresponding pixel in a previous frame;
    the processor comparing the absolute value of the brightness difference against a preset threshold;
    if the absolute value of the brightness difference is less than or equal to the threshold, judging the pixel as a static pixel, and superimposing the corresponding pixel of at least one previous frame image onto the pixel of the current frame image to form a resulted frame image; and
    if the absolute value of the brightness difference is larger than the threshold, judging the pixel as a dynamic pixel, and replacing the pixel of the previous frame image with the pixel of the current frame image to form a resulted frame image; and
    the processor outputting the resulted frame image.

2. The method of image fusion according to claim 1, wherein when the processor judges that the pixel is a dynamic pixel and replaces the pixel of the previous frame image with the pixel of the current frame image, the processor further multiplies with a gain value before replacing.

3. The method of image fusion according to claim 1, wherein when the processor superimposes the pixel of at least one previous frame image, all the pixels of the previous at least one frame image are judged to be static pixels.

4. A method of image fusion, comprising the steps of:
    using a processor to drive a camera to shoot frame by frame to obtain an image information, wherein the image information comprises a plurality of frames of images, the images are formed sequentially in time series, and each of the images comprises a plurality of pixels;
    the processor performing a block matching method to judge whether the pixel of the current frame image is a static pixel;
    if the pixel is judged as a static pixel, superimposing the pixel of at least one previous frame image onto the pixel of the current frame image to form a resulted frame image; and
    if the pixel is judged as a dynamic pixel, replacing the pixel of the previous frame image with the pixel of the current frame image to form a resulted frame image; and
    the processor outputting the resulted frame image.

5. A method of image fusion, comprising the steps of:
    using a processor to drive a camera to shoot frame by frame to obtain an image information, wherein the image information comprises a plurality of frames of images, the images are formed sequentially in time series, and each of the images comprises a plurality of pixels;
    the processor performing an optical flow method to judge whether the pixel of the current frame image is a static pixel;
    if the pixel is judged as a static pixel, superimposing the pixel of at least one previous frame image onto the pixel of the current frame image to form a resulted frame image; and
    if the pixel is judged as a dynamic pixel, replacing the pixel of the previous frame image with the pixel of the current frame image to form a resulted frame image; and
    the processor outputting the resulted frame image.

6. The method of image fusion according to claim 4, wherein when the processor judges that the pixel is a dynamic pixel and replaces the pixel of the previous frame image with the pixel of the current frame image, the processor further multiplies with a gain value before replacing.

7. The method of image fusion according to claim 4, wherein when the processor superimposes the pixel of at least one previous frame image, all the pixels of the previous at least one frame image are judged to be static pixels.

8. The method of image fusion according to claim 5, wherein when the processor judges that the pixel is a dynamic pixel and replaces the pixel of the previous frame image with the pixels of the current frame image, the processor further multiplies with a gain value before replacing.

9. The method of image fusion according to claim 5, wherein when the processor superimposes the pixel of at least one previous frame image, all the pixels of the previous at least one frame image are judged to be static pixels.

* * * * *